(12) United States Patent
Dengel

(10) Patent No.: US 9,212,568 B2
(45) Date of Patent: Dec. 15, 2015

(54) CONTROL SYSTEM FOR MATCHING THE OUTPUT OF A STEAM TURBINE TO A CHANGED LOAD

(75) Inventor: Andreas Dengel, Neunkirchen (DE)

(73) Assignee: Ulrich DREIZLER, Hausen ob Verena (DE)

( * ) Notice: Subject to any disclaimer, the term of this patent is extended or adjusted under 35 U.S.C. 154(b) by 172 days.

(21) Appl. No.: 14/115,435

(22) PCT Filed: Apr. 25, 2012

(86) PCT No.: PCT/EP2012/001757
§ 371 (c)(1),
(2), (4) Date: Nov. 4, 2013

(87) PCT Pub. No.: WO2012/150008
PCT Pub. Date: Nov. 8, 2012

(65) Prior Publication Data
US 2014/0090378 A1    Apr. 3, 2014

(30) Foreign Application Priority Data

May 5, 2011   (DE) .......................... 10 2011 100 517

(51) Int. Cl.
*F01K 7/34*        (2006.01)
*F01K 1/00*        (2006.01)
(Continued)

(52) U.S. Cl.
CPC . *F01K 3/006* (2013.01); *F01K 3/06* (2013.01); *F01K 3/12* (2013.01); *F01K 7/22* (2013.01);
(Continued)

(58) Field of Classification Search
CPC ........... F01K 3/006; F01K 7/345; F01K 3/06; F01K 13/02; F01K 7/22; F01K 7/40; F01K 3/12; F28D 20/00; F28D 20/02; F28D 2020/0047; Y02E 60/142
USPC ........... 60/653, 659, 654, 677–680, 660, 664, 60/676
See application file for complete search history.

(56) References Cited

U.S. PATENT DOCUMENTS 3,129,564 A *   4/1964   Brunner ........................... 60/659
4,003,786 A *   1/1977   Cahn ............................. 376/322
(Continued)

FOREIGN PATENT DOCUMENTS

DE       26 32 777  A1   2/1977
DE       41 21 462  A1   1/1993
(Continued)

OTHER PUBLICATIONS

International Search Report of PCT/EP2012/001757, mailed May 21, 2013.
(Continued)

*Primary Examiner* — Hoang Nguyen
(74) *Attorney, Agent, or Firm* — Collard & Roe, P.C.

(57) ABSTRACT

The invention relates to a control system for matching the output of a steam turbine (2) to a changed load, in particular for the short-term matching of the output of a power plant steam turbine (2) to changed network loads within the context of primary control. The control system according to the invention is characterized by a heat store (33) which, when there is an increased volume of steam tapped off from the steam turbine (2) under a correspondingly reduced load, extracts heat from the steam and which, when there is a reduced quantity of steam tapped off from the steam turbine under a correspondingly increased load, gives up heat to a steam/feed water circuit supplying the steam turbine (2).

7 Claims, 1 Drawing Sheet

Figure 1:
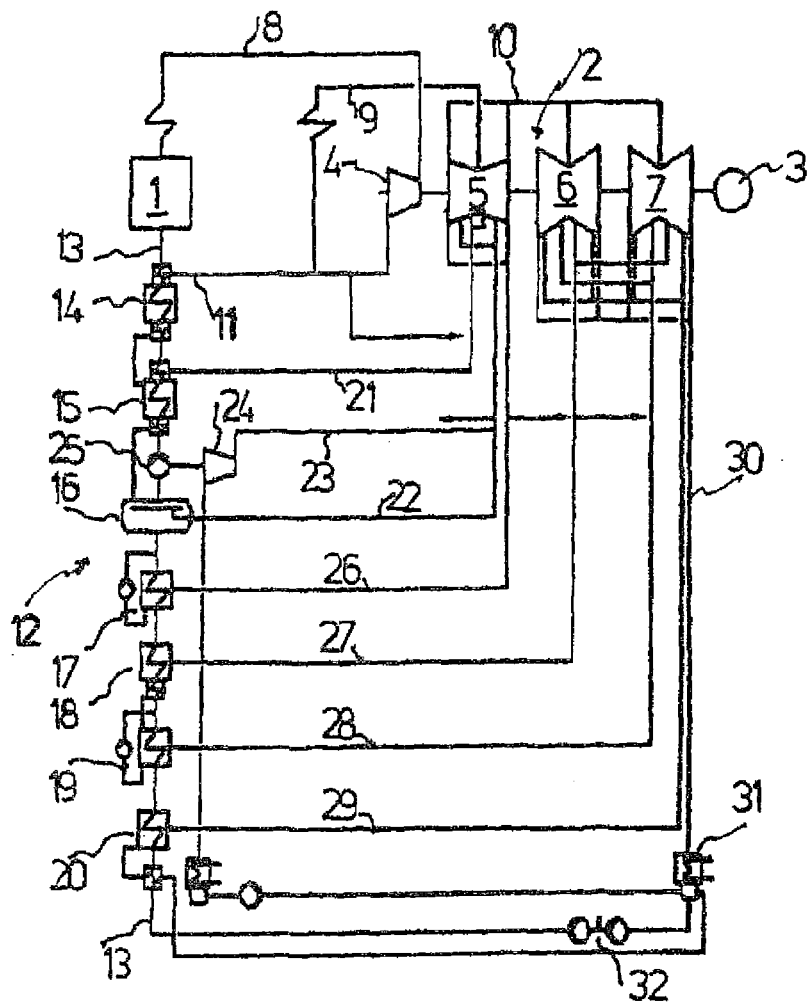

(51) Int. Cl.
  *F01K 3/00* (2006.01)
  *F01K 3/06* (2006.01)
  *F01K 3/12* (2006.01)
  *F01K 7/22* (2006.01)
  *F01K 7/40* (2006.01)
  *F01K 13/02* (2006.01)
  *F28D 20/00* (2006.01)
  *F28D 20/02* (2006.01)

(52) U.S. Cl.
  CPC . *F01K 7/345* (2013.01); *F01K 7/40* (2013.01); *F01K 13/02* (2013.01); *F28D 20/00* (2013.01); *F28D 20/02* (2013.01); *F28D 2020/0047* (2013.01); *Y02E 60/142* (2013.01)

(56) References Cited

U.S. PATENT DOCUMENTS

| | | | | |
|---|---|---|---|---|
| 4,130,992 A | * | 12/1978 | Bitterlich et al. | 60/652 |
| 4,172,766 A | * | 10/1979 | Laing et al. | 202/173 |
| 4,399,656 A | * | 8/1983 | Laing et al. | 60/659 |
| 5,207,268 A | | 5/1993 | Krause et al. | |
| 7,737,578 B2 | | 6/2010 | Dengel et al. | |
| 2006/0266039 A1 | | 11/2006 | Skowronski et al. | |
| 2009/0125152 A1 | | 5/2009 | Skowronski et al. | |

FOREIGN PATENT DOCUMENTS

| | | |
|---|---|---|
| DE | 197 50 125 A1 | 3/1999 |
| DE | 102 60 993 A1 | 7/2004 |
| DE | 10 2005 034 847 AA | 2/2007 |
| FR | 1 396 379 A | 4/1965 |
| GB | 1 524 236 A | 9/1978 |
| WO | 2006/072576 A1 | 7/2006 |

OTHER PUBLICATIONS

German Search Report in DE 10 2011 100 517.3, Jan. 4, 2012, with English translation of relevant parts.

* cited by examiner

CONTROL SYSTEM FOR MATCHING THE OUTPUT OF A STEAM TURBINE TO A CHANGED LOAD

CROSS REFERENCE TO RELATED APPLICATIONS

This application is the National Stage of PCT/EP2012/001757 filed on Apr. 25, 2012, which claims priority under 35 U.S.C. §119 of German Application No. 10 2011 100 517.3 filed on May 5, 2011, the disclosures of which are incorporated by reference. The international application under PCT article 21(2) was not published in English.

The invention relates to a control system for matching the output of a steam turbine to a changed load, particularly for short-term matching of the output of a power plant steam turbine to changed network loads, for example within the scope of what is called primary regulation.

It is known that short-term variations in the current network load are absorbed by the power plants that are part of the primary regulation. In this connection, in addition to what is called the condensate stop method, the known flow throttling method is used, in which the power plant steam turbine has a throttled steam flow supplied to it from the steam generator boiler. For a short-term load increase or reduction, the degree of throttling is increased or reduced. The use of both methods leads to operation of the power plant system at a reduced degree of efficiency.

From WO 2006/072576 A1, a control system is known in which cells that electrolytically produce hydrogen are shut off for a short-term increase of the output that can be supplied to the network, and switched on when the network output demand is reduced. The power plant system can thereby be operated at an optimal degree of efficiency at all times. The energy-rich hydrogen that is produced can be utilized in different ways.

The invention is based on the task of creating a new control system of the type mentioned initially, which requires little construction effort.

The control system according to the invention, which accomplishes this task, is characterized by a heat reservoir that extracts heat from the tapped steam when an increased amount of steam is tapped from the steam turbine in accordance with a reduced load, and gives off heat to a steam/feed water circuit that supplies the steam turbine when a reduced amount of steam is tapped from the steam turbine in accordance with an increased load.

The change in turbine output according to the invention, by means of increasing or reducing the tapped amount of steam, makes it possible, in connection with the heat reservoir according to the invention, to operate the steam turbine at a uniform degree of efficiency, at least on an average over time. Short-term readjustment of the boiler line can be eliminated.

The heat reservoir is preferably provided to give off heat to a pre-heater segment of the steam/feed water circuit that is supplied with the tapped steam, particularly for absorbing heat and giving off heat, in each instance, while keeping the total heat being transferred to the feed water in the pre-heater segment constant. Despite a changed amount of tapped steam, nothing changes in the pre-heater segment; the feed water gets into the steam generator boiler at a uniform temperature.

In a preferred embodiment of the invention, the tapped steam is tapped in the high-pressure region of the steam turbine.

Accordingly, the heat reservoir is preferably provided to give off heat to the steam/feed water circuit in the high-pressure region of the steam/feed water circuit.

In a further embodiment of the invention, the heat reservoir can also absorb heat from a different heat source, instead of from tapped steam, particularly if the balance of the required control energy is negative. It would be possible, if waste heat is not available, to heat the heat reservoir separately, for example also electrically, in times of an excess supply of current.

In one embodiment of the invention, multiple heat reservoirs that absorb or give off heat at different temperatures can be provided, which are supplied by means of taps in different pressure and temperature regions of the turbine.

The heat reservoir can be a latent heat reservoir that absorbs or gives off heat at a constant temperature. Depending on the temperature, different storage substances are possible.

In one embodiment of the invention, the heat reservoir has a molten salt as the storage substance.

The invention will be explained further below, using exemplary embodiments and the attached drawings, which relate to one of these exemplary embodiments. The drawings show:

FIG. 1 a schematic view of a power plant system with a steam turbine, and

Figure 2:
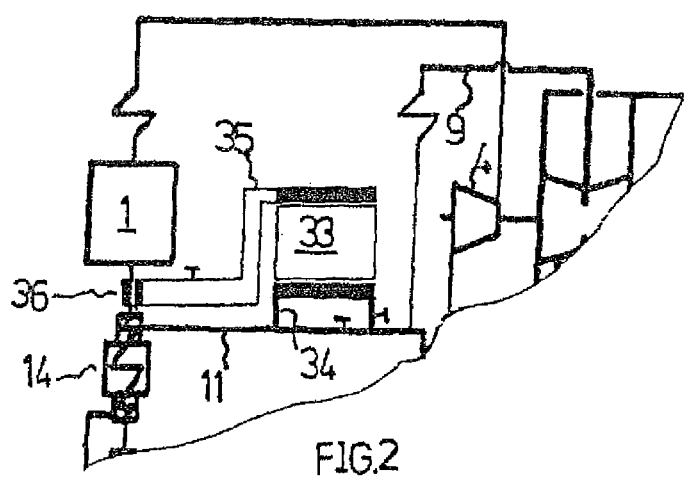

FIG. 2 a partial view of the power plant system of FIG. 1, showing the heat reservoir according to the invention.

A power plant system shown schematically in FIG. 1 comprises a steam generator boiler 1 heated with hard coal, a steam turbine 2, and a generator 3 driven by the steam turbine. The steam turbine 2 has a high-pressure part 4, a medium-pressure part 5, and low-pressure parts 6 and 7.

Steam from the steam generator boiler 1 gets into the high-pressure part 4 by way of a line 8, steam relaxed in the high-pressure part 4 gets into the medium-pressure part 5 by way of a line 9 and an intermediate overheating system, and steam worked off in the medium-pressure part 5 gets into the low-pressure parts 6 and 7 by way of a line 10.

A line 11 that leads to a first high-pressure pre-heater 14 of a pre-heating segment 12 for feed water branches off from the line 9; the feed water is supplied to the steam generator boiler 1 by way of a line 13. A further high-pressure pre-heater 15 precedes the high-pressure pre-heater 14; it stands in connection with a feed water container 16, whereby a series of four low-pressure pre-heaters 17, 18, 19, 20 precedes the feed water container 16.

A line 21 for tapping steam from the medium-pressure part 5 of the turbine 2 opens into the high-pressure pre-heater 15, whereby steam that is only partially worked off and is still under relatively high pressure is branched off out of the turbine in the medium-pressure part. Steam that is worked off further in the medium-pressure part 5 gets directly into the feed water container 16 by way of a line 22. A line 23 for supplying a steam turbine 24 branches off from the line 22. The steam turbine 24 drives a feed water pump 25 that follows the feed water container 16.

Steam that has been completely worked off by the medium-pressure part 5 of the steam turbine 2 gets into the low-pressure pre-heater 17 by way of a line 26. The low-pressure pre-heaters 18 to 20 receive steam from taps of the low-pressure parts 6 and 7, by way of lines 27 to 29. Steam that has been completely worked off by the steam turbine 2 flows into a condenser 31 through a line 30. A condenser pump 32 conveys the condensate into the feed water container 16 by way of the feed water line 13, while heating it by means of the low-pressure pre-heaters 17 to 20.

FIG. 2 shows a heat reservoir 33 not shown in FIG. 1, which can absorb heat by way of a heat exchanger circuit 34 that runs parallel to the line 11, and can give off heat to a heat exchanger circuit 35. A heat exchanger 36 of the heat exchanger circuit 35 transfers this heat to the feed water in the feed water line 13.

The heat reservoir 33 can be, for example, a latent heat reservoir having a storage substance that absorbs or gives off heat at a constant temperature within the scope of phase transformation. Molten salt, for example, can serve to store heat at the temperature of about 300° C. that is required in the present case.

A device that corresponds to the heat reservoir 33 and corresponds to the heat exchanger circuits 34, 35, designed for a lower temperature, could alternatively or additionally be provided on at least one of the further steam tap lines 21 as well as 26 to 29.

The power plant system described above is part of what is called the primary regulation of the network frequency, i.e. the power plant system matches its output to short-term variations of the network load, in order to maintain the network frequency.

If the network load drops over the short term, a corresponding reduction in the output of the steam turbine 2 is brought about by increasing the amount of steam tapped by way of the line 11. In comparison with the normal amount of steam tapped before, a greater amount of heat is thereby transported, the increased proportion of which, as compared to the normal amount of steam, is not needed for pre-heating the feed water. The amount of steam branched off from the line 11 into the heat exchanger circuit 34 is therefore adjusted in such a manner that this increased proportion of the amount of heat transported by the steam is not given off to the heat reservoir 33. This does not cause any change in the heat exchange with the pre-heater segment 12.

For longer-term matching of the turbine output to the lowered network load, the output of the steam generator boiler 1 can be reduced accordingly, and the amount of steam tapped by way of the line 11 can be set back to the normal dimension, or, if necessary, to the dimension matched to the changed output of the steam generator boiler.

In the case of a short-term increase in the network load, the amount of steam tapped by way of the line 11 is reduced for a rapid increase in the turbine output, so that more steam is available for operation of the turbine. Accordingly, less heat is transported into the pre-heater segment. The shortage amount can now be balanced out by putting the heat exchanger circuit 35 into operation, which guides heat from the heat reservoir 33 into the pre-heater segment 12. Pre-heated feed water arrives at the steam generator boiler 1 with an unchanged temperature.

For longer-term matching to an increased network load, the output of the steam generator boiler can be increased accordingly, and the amount of steam branched off by way of the line 11 can be increased again to the normal dimension, or, if necessary, to the dimension matched to the changed output of the steam generator boiler.

In contrast to the known control systems used for primary regulation, which are based on flow throttling of the steam flow carried into the steam turbine or on the condensate stop method, variation of the tapped amount of steam in connection with intermediate storage of heat when reduced load requirements occur is not connected with a reduction in the degree of efficiency of the power plant system.

The invention claimed is:

1. Control system for matching the output of a steam turbine to a changed load, the control system comprising:
a heat reservoir
that extracts and absorbs heat from tapped steam from a line when an increased amount of steam is tapped from the steam turbine in accordance with a reduced load, wherein the line feeds the tapped steam to a pre-heating segment of a steam-feed water circuit, and the steam/feed water circuit supplies the steam turbine,
that gives off heat to the pre-heating segment of the steam/feed water circuit when a reduced amount of steam is tapped from the steam turbine in accordance with an increased load, and
that is a latent heat reservoir that absorbs or gives off heat at a constant temperature.

2. Control system according to claim 1, wherein the heat reservoir is provided for absorbing heat and giving off heat, in each instance, while keeping the total heat being transferred to the feed water in the pre-heating segment constant.

3. Control system according to claim 1, wherein the tapped steam is steam tapped in the high-pressure region of the steam turbine.

4. Control system according to claim 1, wherein the heat reservoir is provided to give off heat to the steam/feed water circuit in the high-pressure region of the steam/feed water circuit.

5. Control system according to claim 1, wherein the heat reservoir is provided with absorption of heat from a further heat source, instead of from tapped steam.

6. Control system according to claim 1, wherein multiple heat reservoirs that absorb or give off heat at different temperatures are provided.

7. Control system according to claim 1, wherein the heat reservoir has molten salt as the storage substance.

* * * * *